United States Patent [19]

Densmore

[11] 4,130,185

[45] Dec. 19, 1978

[54] POLE VIBRATION DAMPER

[75] Inventor: Russell A. Densmore, Dublin, Calif.

[73] Assignee: Kaiser Aluminum & Chemical Corporation, Oakland, Calif.

[21] Appl. No.: 832,692

[22] Filed: Sep. 12, 1977

[51] Int. Cl.² .............................................. F16F 7/10
[52] U.S. Cl. ..................................... 188/1 B; 174/42; 408/143
[58] Field of Search .......................... 188/1 B; 124/89; 408/143; 174/42

[56] References Cited

U.S. PATENT DOCUMENTS

| 1,648,120 | 11/1927 | Harrison | 188/1 B |
|---|---|---|---|
| 2,028,930 | 1/1936 | Taylor | 173/13 |
| 3,259,212 | 7/1966 | Nishioka et al. | 188/1 B |
| 3,559,512 | 2/1971 | Aggarwal | 188/1 B |
| 3,612,222 | 10/1971 | Minor | 188/1 B |
| 3,774,730 | 11/1973 | Maddux | 188/1 B |
| 3,938,626 | 2/1976 | Hopkins | 188/1 B |

FOREIGN PATENT DOCUMENTS 446532  2/1948  Canada ........................................ 173/13

OTHER PUBLICATIONS

Minor, Ray C., *Damp Destructive Pole Vibration*, Electric Light and Power, 12–1973.

*Primary Examiner*—George E. A. Halvosa
*Attorney, Agent, or Firm*—Paul E. Calrow; John S. Rhoades

[57] ABSTRACT

A vibration damper attachable to a pole structure and comprised of a plurality of individual vibration damping discs or weights mounted for controlled and limited movement within a housing together with rods insertable in an improved fashion through openings in the discs and separator washers for vertically stacking the discs along with separator washers within the housing.

10 Claims, 4 Drawing Figures

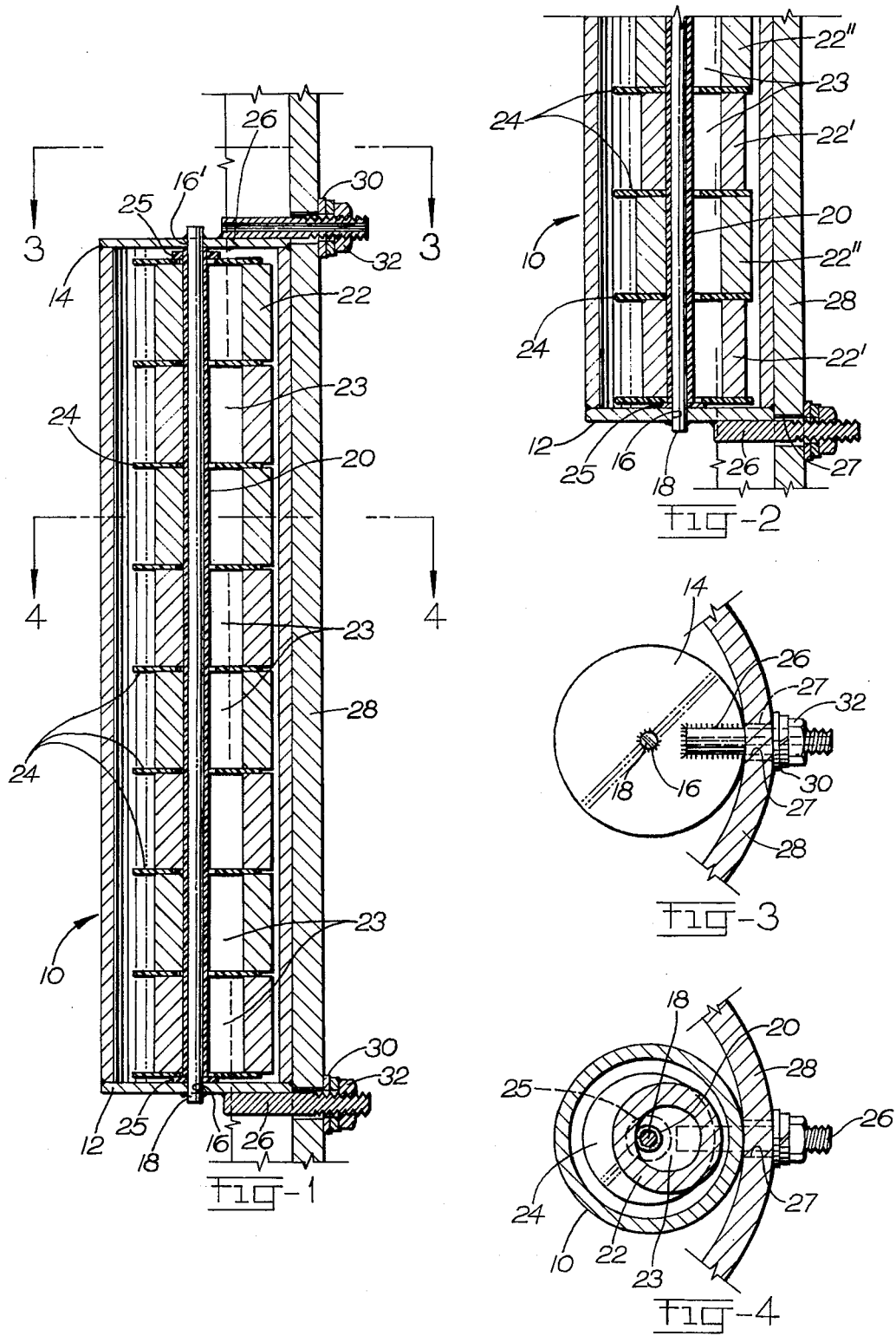

POLE VIBRATION DAMPER

BACKGROUND OF THE INVENTION

The instant invention relates to vibration dampers for pole structures. More particularly it is concerned with a pole vibration damper that constitutes an improvement over that shown and described in U.S. Pat. No. 3,612,222.

As indicated in the aforesaid patent and a literature article entitled "Damp Destructive Pole Vibration" by Ray C. Minor that appeared in the December, 1973 issue of the magazine "Electric Light and Power", wind induced vibrations unless compensated for can destroy lighting poles and like structures. There are various kinds of wind induced vibrations that must be controlled including in particular those of a relatively high frequency which induce vibratory oscillation at an intermediate or at the midpoint portion of the pole structure.

Other pole induced vibrations requiring corrective action involve those created by the mechanical transfer of motion and sound to the pole structure by the movement and sound of traffic in the vicinity of the pole structure.

Prior art dampers for light poles and similar structures have taken various forms such as the pendulum devices of U.S. Pat. No. 3,259,212; the oscillation damping devices of U.S. Pat. No. 3,174,589 and the inertia mass rod and holder tube of U.S. Pat. No. 3,612,222.

The instant damper is designed to be less susceptible than prior art pole dampers such as those of the above patents to falling into phase with the various pole vibrational resonant frequencies, while still remaining, however, relatively sensitive to multiple and varying pole vibrational changes resulting from changes in wind direction and velocities and changing patterns in the movement of surrounding traffic.

This is accomplished in the damper of the instant invention by the use of multiple doughnut shaped metal discs or weights vertically and loosely arranged in a unique fashion about a rod disposed in a housing attached to the pole.

As in the case of the damper of U.S. Pat. No. 3,612,222, the instant damper can be fitted to existing as well as new pole structures and it also can be readily concealed inside a hollow pole structure if this is required for either esthetic purposes or to avoid vandalism. The instant damper also constitutes an improvement over those disclosed in the prior art U.S. Pat. Nos. 2,051,954; 2,714,161; 2,960,189; 2,195,041; 3,923,414; 3,207,009; 3,259,212; 3,938,626 and British Patent No. 920,586.

SUMMARY OF THE INVENTION

In the accompanying drawings:

FIG. 1 is a vertical sectional view of the damper of the instant invention shown as being attached such as by stud bolts to a typical lighting pole structure;

FIG. 2 is a fragmentary sectional view of the lower portion of the damper of FIG. 1 and discloses a modified form of inertia disc arrangement that can be used with the damper of the instant invention;

FIG. 3 is a view taken generally along line 3—3 of FIG. 1; and

FIG. 4 is a cross-sectional view taken generally along line 4—4 of FIG. 1.

DETAILED DESCRIPTION

With further reference to the drawings and in particular FIGS. 1, 3 and 4, a preferred embodiment of the vibration damper for pole structures of the instant invention contemplates that the damper be comprised of an elongated housing 10 made from metal or other suitable material. Housing 10 can take the form of an elongated tube provided with end caps 12 and 14 that are welded or otherwise secured to the open ends of the tube. One of the end caps, such as bottom end cap 12 is provided with a central aperture 16 within which the bottom extremity of a metal rod 18 is inserted and then appropriately welded to the cap. The outside of this rod may be fitted with a plastic covering or sleeve 20 that has a longitudinal dimension slightly less than the interior of housing 10 and this sleeve is adapted to fit snugly about the rod 18.

Thereafter, a plurality of vibration damping metal, e.g., steel discs or inertia masses 22 are vertically stacked on the rod 18 and they are separated one from another by means of wafer-like plastic washers 24 that also fit about rod 18. The plastic washers 24 can be made out of teflon, nylon or the like so long as they provide smooth sliding or relatively friction free surfaces between discs 22 and they each have a central aperture which is but slightly larger than the circumference or outer periphery of plastic sleeve covering 20 whereby washers 24 fit rather snugly about the composite structure formed by the rod 18 and covering 20. Washers 24 are oversized or have a greater outer periphery than discs 22. Metal vibrational discs 22 can all be cut initially from the same tubular member, and in the case of the device shown in FIGS. 1, 3 and 4, each disc has a central aperture 23 which is of substantially greater circumference or cross-sectional size than the outer circumference of jacket 20.

After the discs 22 have all been stacked upon the rod 18 and with the washers 24 disposed there between in the manner indicated in FIG. 1, a final end cap 14 is welded to the top of the tube 10. Cap 14 is also provided with an opening 16' similar to opening 16 through which the opposite extremity of the rod 18 is inserted and then subsequently welded in a fixed position to the top cap 14.

The damper assembly is completed by welding to the top and bottom caps 12 and 14 suitable stud bolt elements 26 by means of which the housing 10 and the damper elements disposed therein can be appropriately mounted on the inside of a hollow pole or the like in the manner shown in the drawings. The threaded end of stud bolts 26 fit within the openings 27 of the pole 28 and are adapted to be fitted with washers 30 and nuts 32. The topmost bolt can be provided with a bore through which a small steel wire may be fitted. The wire can then be looped and knotted and subsequently used to hoist the damper up through the pole in a manner well known in the art until the damper is worked into position and stud bolts 26 made to protrude through openings 27 in the pole 28 and washers 30 and nuts 32 installed. If desired and as indicated in FIG. 1 additional small washer spacers 25 may be mounted at the ends of rod 18 to help space discs 22 from the end caps 12 and 14.

The operation of the damper is as follows: When a pole to which the damper is affixed begins to vibrate for reasons of wind flow or the movement of surrounding traffic, the individual discs 22 which are free to move and are restrained only by their contact with central rod 18 will respond accordingly. The discs are free to move individually because of their lack of interconnection and their ability to slide between the slippery surfaces of washers 24 to the full extent of the size of openings 23 and in any horizontal direction through a full 360 degree arc or a full circle but without banging into the wall of housing 10. Limited up and down movement is permitted by making the discs 22 and washers 24 and 25 of such a thickness or width that they do not completely fill the interior of the housing 10.

Because of the use of the individual discs 22 and oversized washers 24 that provide slippery bearing surfaces in all directions of the compass and the fact that the various peripheral dimensions of discs 22 and their openings 23 preclude frictional contact of discs 22 with housing 10 the discs 22 are extremely sensitive and responsive to even the smallest vibrational movements of the pole. As a consequence, discs 22 operate in a relatively rapid and muffled sound fashion to compensate for and to dampen even relatively small vibrations before they increase to more violent vibrations which could be harder to dampen than those which are of relatively small amplitudes and resonant frequencies.

A modified form of disc element that can be used is indicated in FIG. 2. In this case the relative sizes of adjacent discs can be changed so that the mass of one disc is different from another disc, e.g., disc 22' can be smaller than an adjacent disc 22''. It is also within the contemplation of the invention, depending upon the results desired or a particular pole installation, that the individual discs 22 be of progressively increased mass from the top of rod 18 to the bottom and vice versa depending upon the vibrational conditions to be corrected.

Advantageous embodiments of the invention have been shown and described. It is obvious that various changes may be made therein while remaining within the scope of the appended claims wherein:

What is claimed is:

1. A vibration damper for pole structures and the like comprising in combination with a pole structure a housing affixed to the pole structure and a plurality of metal vibration damping discs of smaller outer peripheral dimensions than the interior cross section of said housing mounted for controlled and limited movement within the housing, each of said discs being provided with a centrally disposed aperture, means for loosely and vertically stacking said discs within said housing including a rod means which is centrally and vertically disposed within the housing and which is insertable within the apertures of said discs, said rod means having a substantially smaller outer peripheral dimension than the peripheral dimensions of the various disc apertures, and apertured washer means of a different material from said discs mounted on said rod means between adjacent discs and providing slippery contact surfaces and separators between adjacent discs wherein the relative sizes of the outer peripheries of the discs and the sizes of the central apertures of the discs are adjusted and correlated so as to prevent the discs from contacting the housing during movements of the same in the housing.

2. The damper as set forth in claim 1 wherein said last mentioned washer means comprises a plastic washer mounted on the rod means between adjacent discs.

3. The damper as set forth in claim 2 wherein the plastic washer is provided with a central aperture that has a peripheral dimension that is slightly larger than the outer periphery of the rod means while being smaller than the apertures of the adjacent discs.

4. The damper as set forth in claim 3 wherein the rod means is provided with a plastic jacket and the central aperture of the plastic washer is slightly larger than the outer circumference of the rod means.

5. The damper of claim 2 wherein the outer periphery of the washer is greater than the outer periphery of an adjacent disc.

6. The damper as set forth in claim 1 wherein the rod means is provided with a plastic covering.

7. The damper as set forth in claim 1 wherein the discs are all of substantially the same cross-sectional dimensions and inertia mass.

8. The damper as set forth in claim 1 wherein one of the discs has a different cross-sectional dimension and mass from those of another disc.

9. The damper as set forth in claim 1 wherein said rod means is a fixed rod means.

10. The damper as set forth in claim 1 wherein the peripheral dimensions of the washer means are greater than those of the discs.

* * * * *